(12) United States Patent
Créscio et al.

(10) Patent No.: US 12,514,153 B2
(45) Date of Patent: Jan. 6, 2026

(54) CONSTRUCTIVE ARRANGEMENT APPLIED TO GRAIN HARVESTING MACHINE

(71) Applicant: Indústrias Colombo S.A., Pindorama (BR)

(72) Inventors: Alexandre Aparecido Créscio, Pindorama (BR); Ighor Busnardo Colombo, Pindorama (BR); Oswaldo Argeu Leite, Catanduva (BR)

(73) Assignee: INDÚSTRIAS COLOMBO S.A., Pindorama (BR)

( * ) Notice: Subject to any disclaimer, the term of this patent is extended or adjusted under 35 U.S.C. 154(b) by 433 days.

(21) Appl. No.: 18/195,131

(22) Filed: May 9, 2023

(65) Prior Publication Data
US 2023/0354749 A1 Nov. 9, 2023

(30) Foreign Application Priority Data
May 9, 2022 (BR) ...................... 10 2022 009002 5

(51) Int. Cl.
*A01D 51/00* (2006.01)
*A01B 73/04* (2006.01)
*A01D 29/00* (2006.01)
*A01D 41/04* (2006.01)
*A01D 41/14* (2006.01)

(52) U.S. Cl.
CPC ............ *A01D 29/00* (2013.01); *A01B 73/044* (2013.01); *A01D 41/04* (2013.01); *A01D 51/002* (2013.01); *A01D 41/144* (2013.01); *A01D 51/007* (2013.01)

(58) Field of Classification Search
CPC .... A01D 51/002; A01D 51/007; A01D 29/00; A01D 41/04; A01D 41/1208; A01D 46/082; A01D 45/22; A01B 73/044; B60P 1/30
See application file for complete search history.

(56) References Cited

U.S. PATENT DOCUMENTS

| | | | | |
|---|---|---|---|---|
| 3,844,615 A | * | 10/1974 | Anderson ................. | B60P 1/30 49/248 |
| 3,846,964 A | * | 11/1974 | Frushour ................. | A01D 29/00 56/16.6 |
| 4,068,891 A | * | 1/1978 | Herbst ...................... | B62B 3/08 298/7 |
| 4,493,601 A | * | 1/1985 | Hill ........................ | A01D 33/10 296/100.1 |
| 5,380,142 A | * | 1/1995 | Hornung ............... | A01D 46/082 298/7 |
| 5,826,947 A | * | 10/1998 | Hornung .................. | B60P 1/34 298/7 |
| 7,908,835 B2 | | 3/2011 | Bertino | |
| 11,957,078 B1 | * | 4/2024 | Herichkoff ............... | B60P 1/36 |
| 2016/0316626 A1 | * | 11/2016 | Bertino ................. | A01D 29/00 |
| 2020/0100430 A1 | * | 4/2020 | Bertino ................. | A01D 75/00 |

* cited by examiner

*Primary Examiner* — Adam J Behrens
*Assistant Examiner* — Julia C Tran
(74) *Attorney, Agent, or Firm* — B. Aaron Schulman, Esq.; Stites & Harbison, PLLC

(57) ABSTRACT

A constructive arrangement applied to a grain harvesting machine reducing the sizes of the bulk carrier and the collecting set, bringing them to measurements which are compatible with the body of the machine, thus enabling transportation next to the machine, with no need to disassemble any parts, having hinges and support arms of the bucket and the support structure of the receiving device provided with hinging devices to reduce their lateral dimensions, those hinging devices being activated by hydraulic cylinders.

2 Claims, 9 Drawing Sheets

CONSTRUCTIVE ARRANGEMENT APPLIED TO GRAIN HARVESTING MACHINE

FIELD OF THE INVENTION

The claimed invention applies to the field of grain harvesting machines.

BACKGROUND OF THE INVENTION

There are several kinds of equipment intended to harvest peanuts, such as e. g. the one disclosed by the patent BR0702108-9, incorporated herein as a reference, which, to be displaced between farms, pulled by a tractor vehicle or for road transportation over trucks or boards, when out of service, the bulk carrier must be dismantled and separately stored from the body of the machine, due to its measurements, thus increasing costs with freight and the technical staff to re-assemble it at the place of destination.

Another inconvenience found in the current state of the art refers to the size of the collecting set, which also causes similar difficulties to transport the device, and thus that constituent.

SUMMARY OF THE INVENTION

The claimed invention applies to grain harvesting machines, mainly for harvesting peanuts, aiming to facilitate the transportation of the device when out of service.

The constructive arrangement applied to a grain harvesting machine as disclosed herein aims to embody devices allowing to reduce the size, both, of the bulk carrier and the collecting set, bringing them to measurements which are compatible with the body of the machine, thus enabling them to be transported next to it.

Such devices provide dimensional adaptation of the equipment, eliminating operational costs as currently incurred to perform this task, and facilitating the safe transport of the equipment both between farms and on roads.

The constructive arrangement applied to a grain harvesting machine of the claimed invention provides, among others, the following advantages:

- elimination of the time required to dismantle and assemble the device;
- reduction of freight costs;
- reduction of the risk of accidents and/or path obstruction when the equipment is displaced between farms; and
- compliance with equipment transport rules over trucks or boards on roads.

To overcome the inconveniences found in the state of the art, the inventors introduced, both on the bulk carrier and the collecting device, hinging devices for their parts exceeding the measurements of the body of the machine, to enable the displacement and transport of the device, with no need to disassemble those constituents. For that purpose, hinges and support arms of the bucket and the support structure of the receiving device are provided with hinging devices to reduce their lateral dimensions, those hinging devices being activated by hydraulic cylinders.

The same hydraulic cylinder responsible for swiveling the bucket is used to reduce its exceeding dimensions, thus having two stages, wherein the former activates the hinging devices for dimensional adaptation of the bucket and the latter promotes its swiveling.

To keep the dimensional adaptation of the bulk carrier in its working position, easily assembled mechanical locks are included, thus guaranteeing its functional stability and workers' safety.

DETAILED DESCRIPTION OF THE INVENTION

Figure 1:
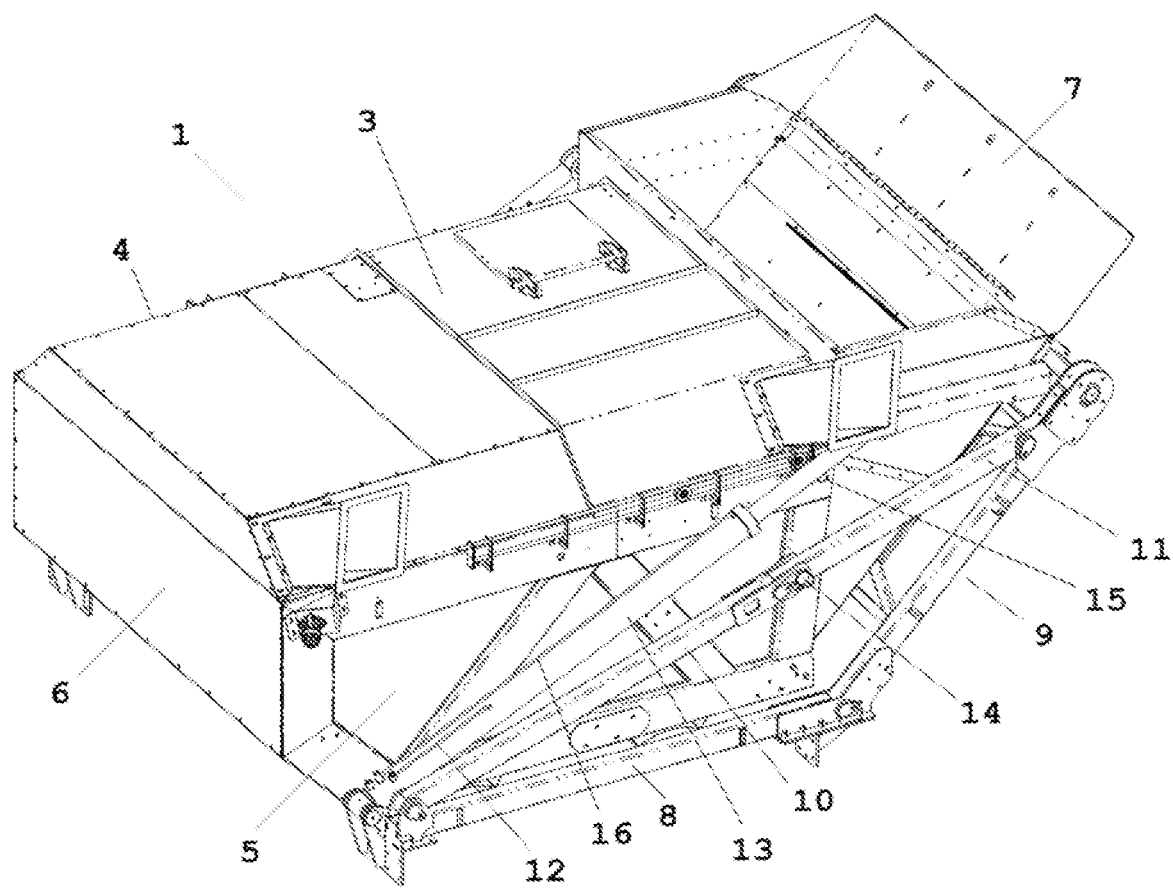
FIG. 1 shows a perspective view of the bucket in a working position.
Figure 2:
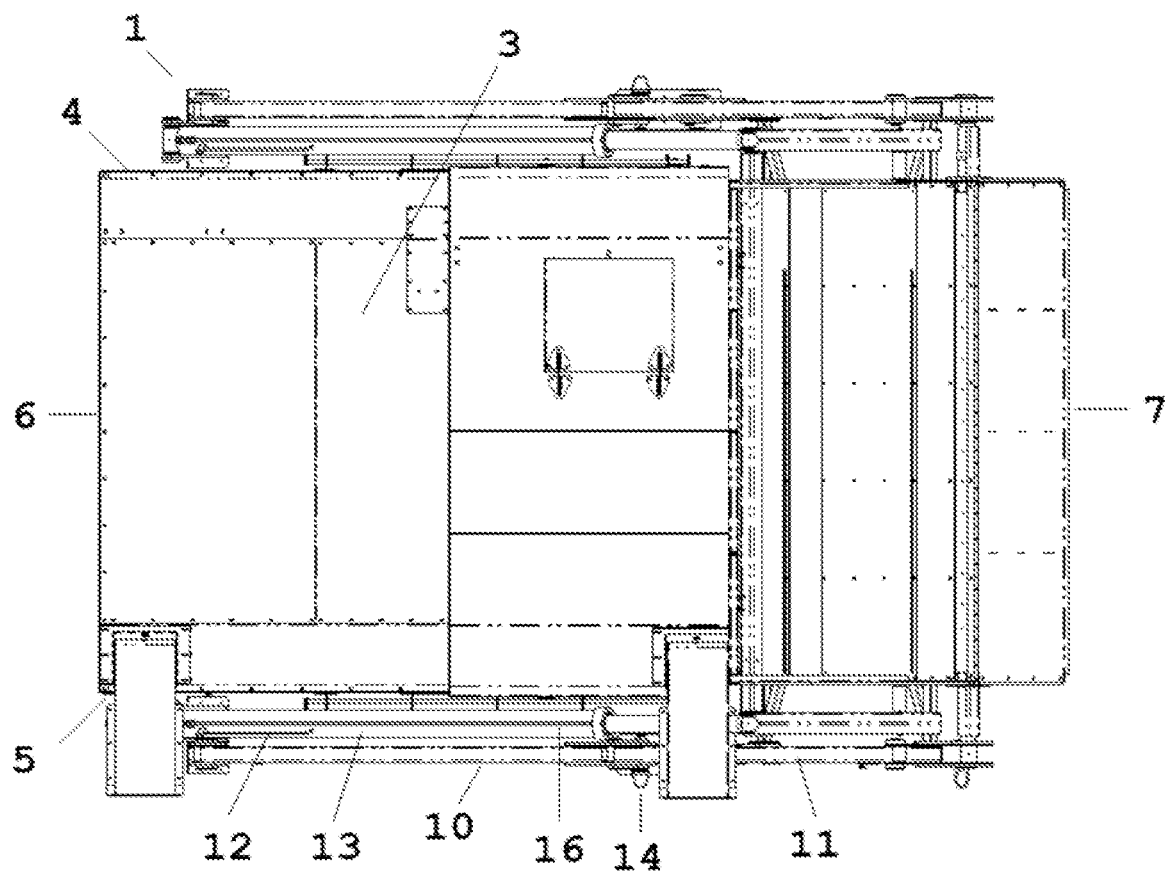
FIG. 2 shows an upper view of the bucket in a working position.
Figure 3:
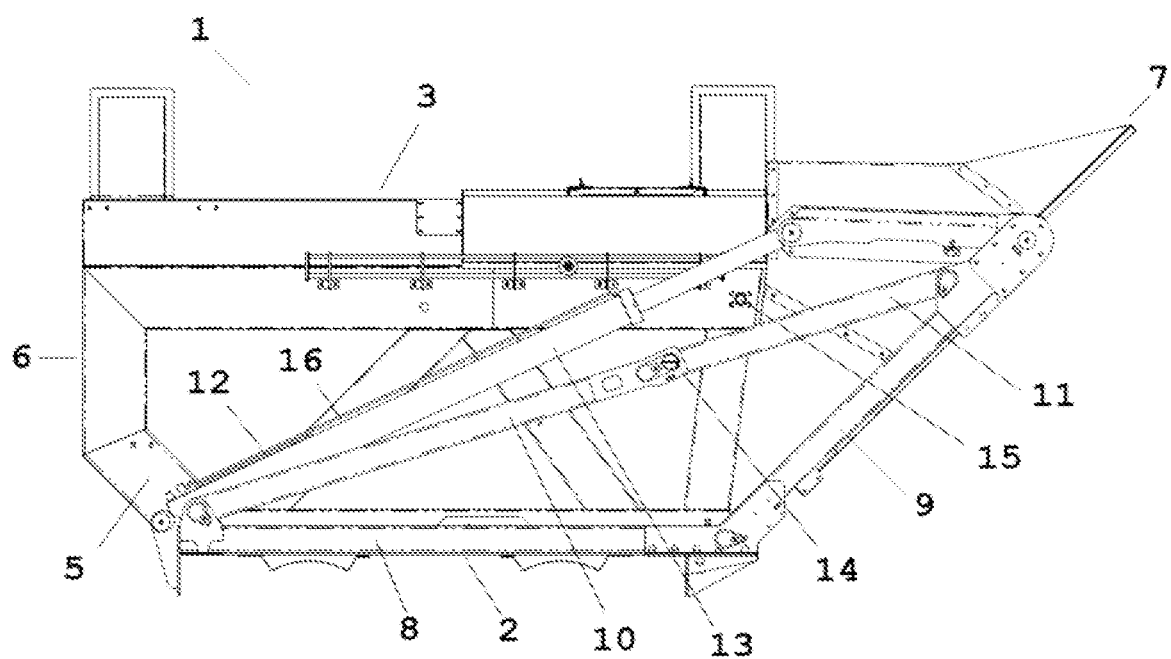
FIG. 3 shows a side view of the bucket in a working position.
Figure 4:
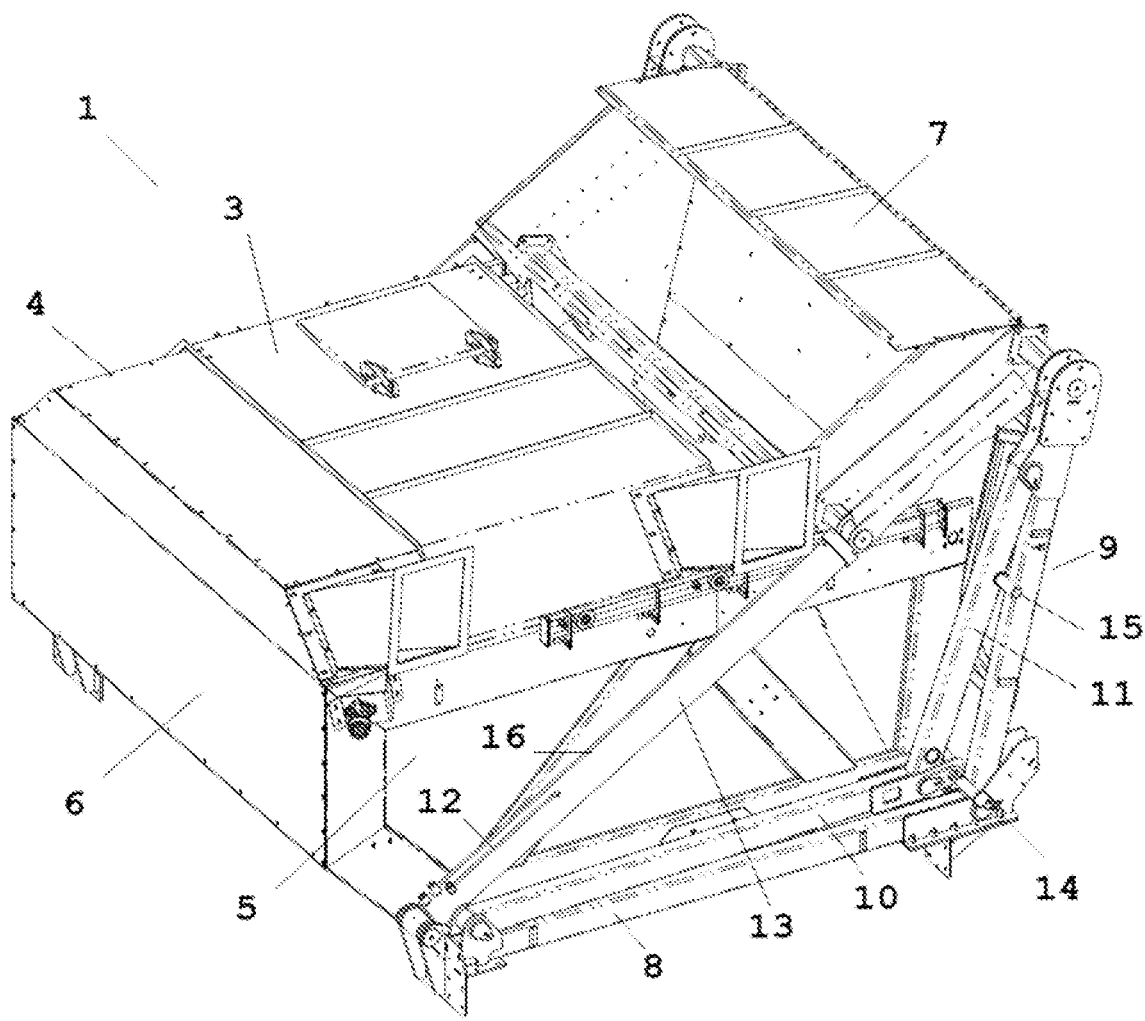
FIG. 4 shows a perspective view of the bucket in a displacement or transport position.
Figure 5:
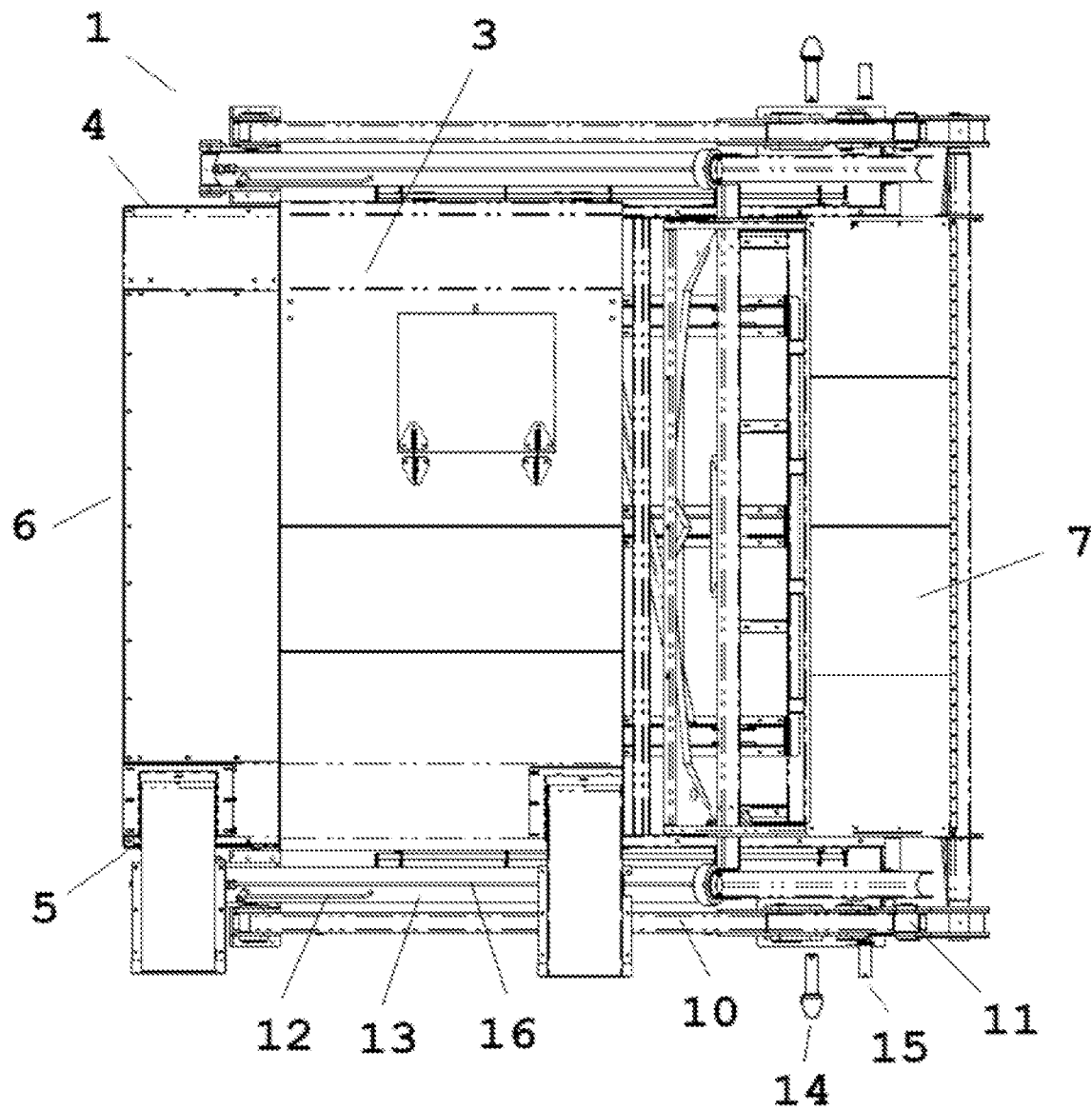
FIG. 5 shows an upper view of the bucket in a displacement or transport position.
Figure 6:
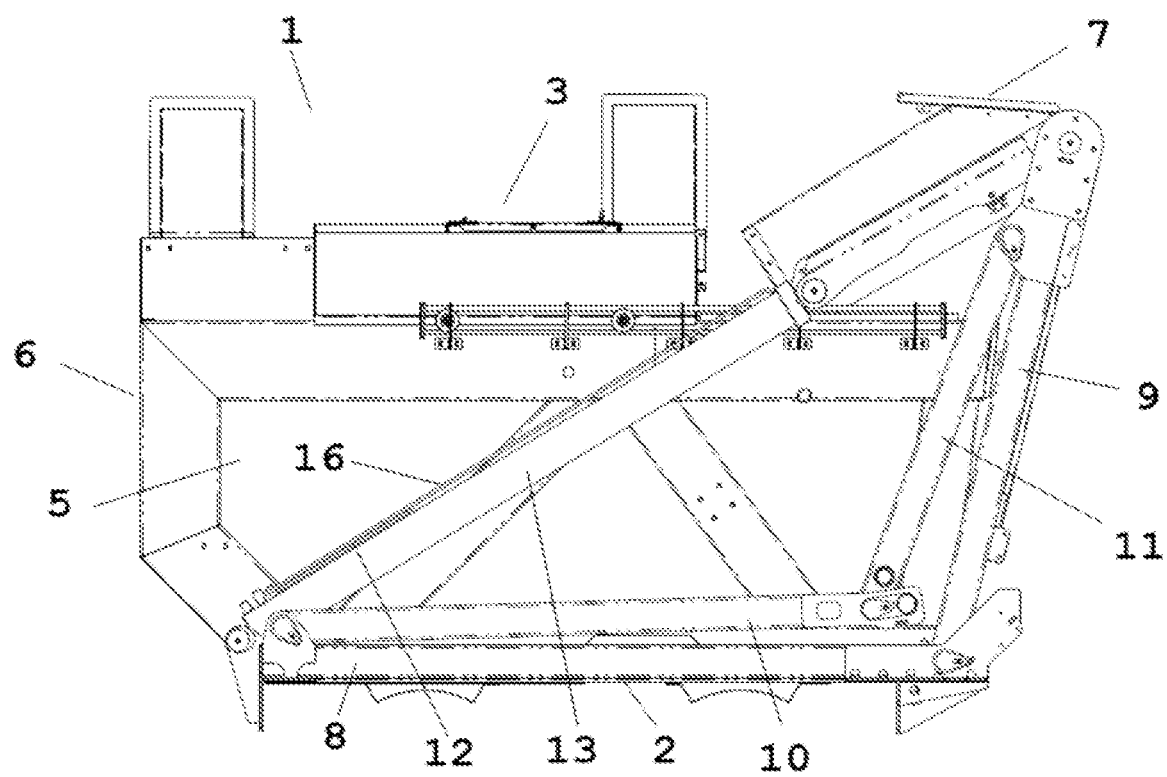
FIG. 6 shows a side view of the bucket in displacement or transport position.

As shown in FIGS. 1 to 6, the claimed arrangement has a bucket (1) defined by a cubic structure, with a base closure (2), an upper closure (3), a front closure (4), a rear closure (5) and two side closures (6), and a discharge mouth (7) mounted onto one of the side closures (6). The arrangement also has hinging devices located in parallel to the front and rear closures, the hinging devices formed by a triangular structure constituted by a first bar (8) and a second bar (9) which are hinged to each other, located in parallel to the base closure and to the side closure (6) bearing the discharge mouth (7). The hinged bars are joined, and also hinged, to a first segmented bar (10) and a second segmented bar (11), which are also hinged to each other. Upon an activation of the first stage (12) of the first set of hydraulic cylinders (13), hinging the first and second bars (8 and 9) and the first and second segmented bars (10 and 11) on the side closure bearing the discharge mouth, so to change the bucket measurement between the working and displacement or transport positions. Locks (14) are included and applied to the second segmented bars (11), as well as locks (15) applied to the front closure (4) and rear closure (5), keeping the relative position of the first and second segmented bars (10, 11) and avoiding the side closing where the discharge mouth is located, from hinging, so that, when the second stage (16) of the first set of hydraulic cylinders (13) is activated, the bucket may be hinged.

Figure 7:
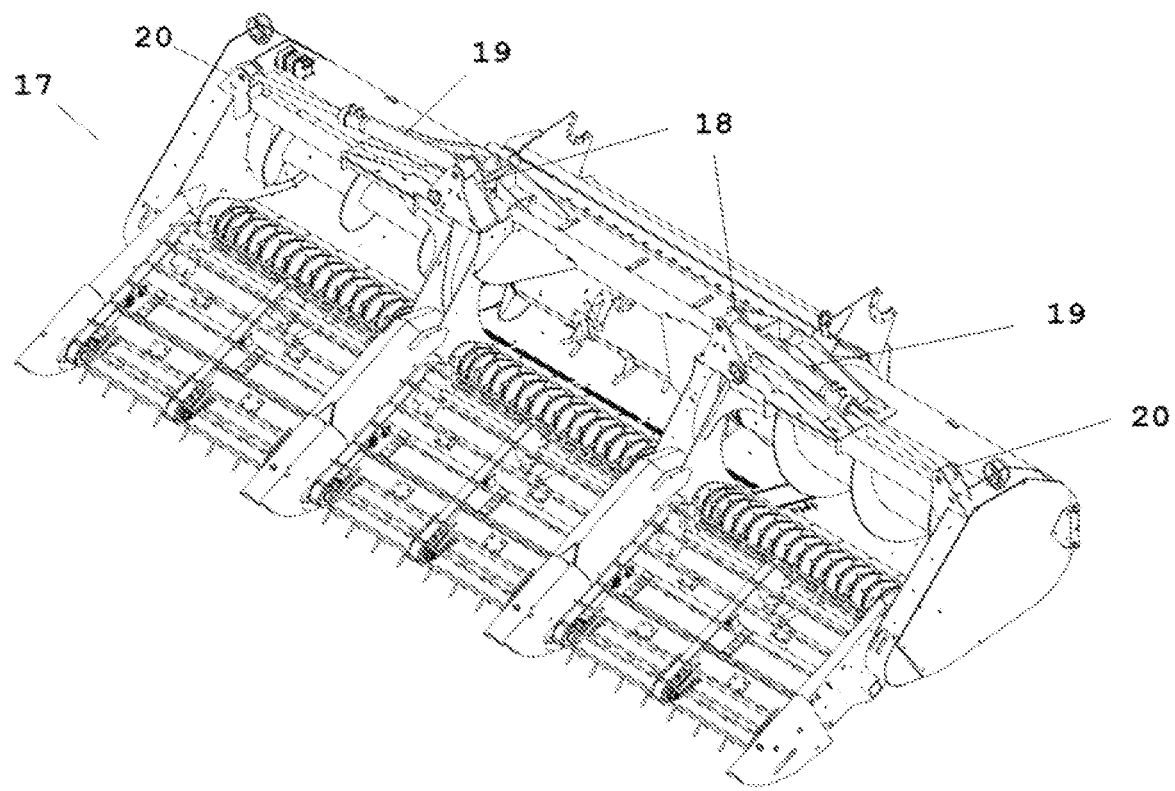
FIG. 7 shows a perspective view of the collecting device in a working position.
Figure 8:
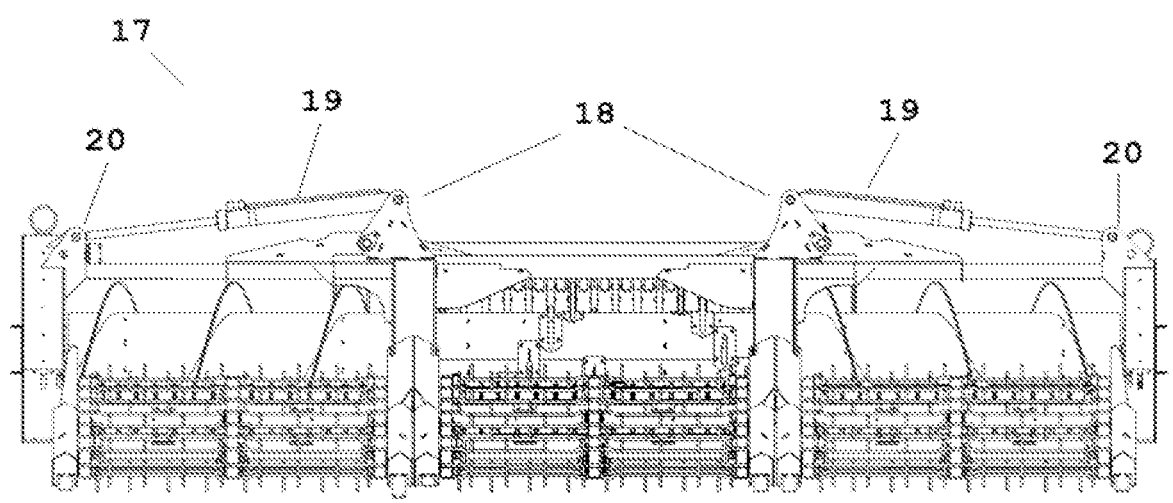
FIG. 8 shows a front view of the collecting device in a working position.
Figure 9:
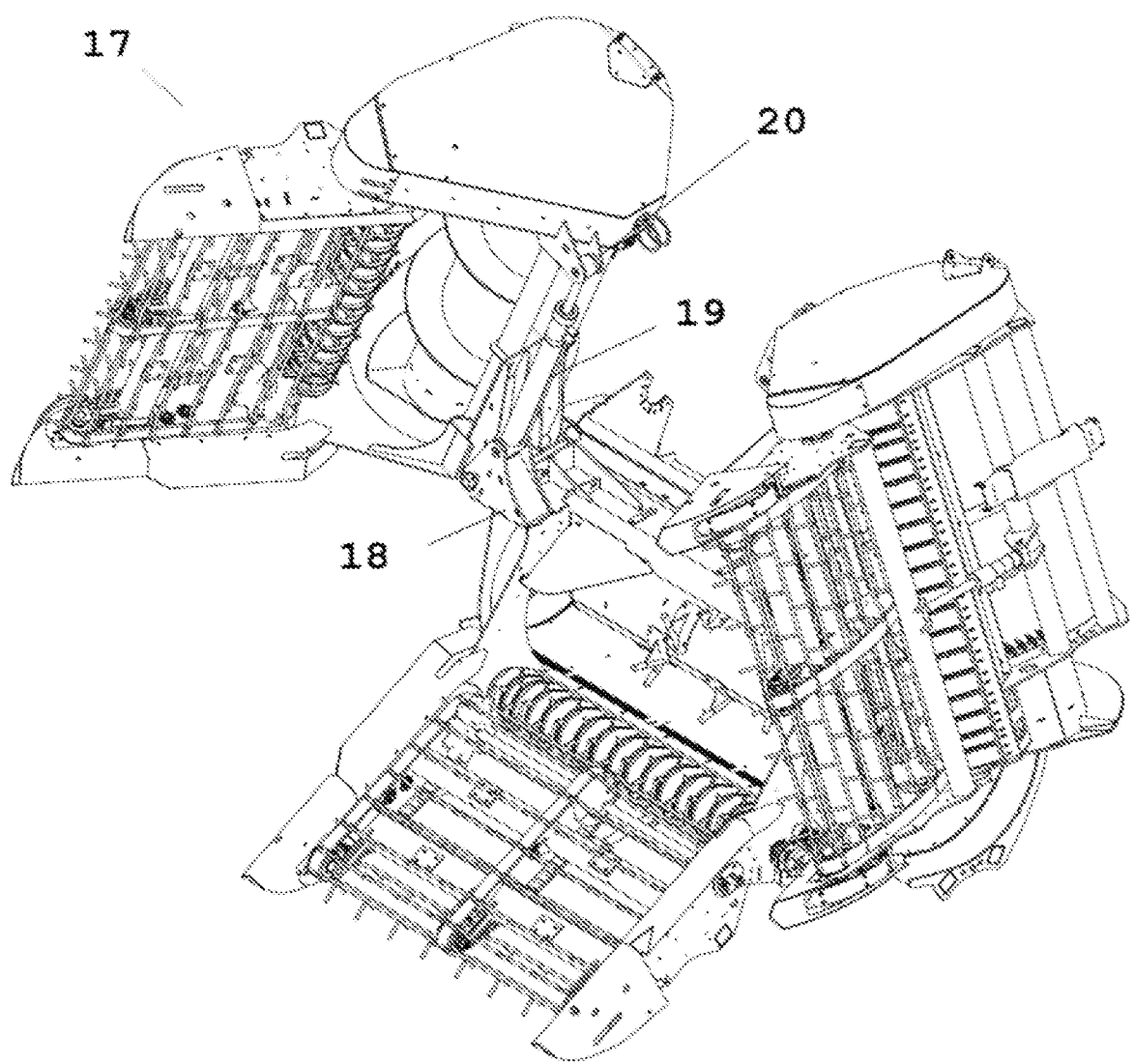
FIG. 9 shows a perspective view of the collecting device in a displacement or transport position.
Figure 10:
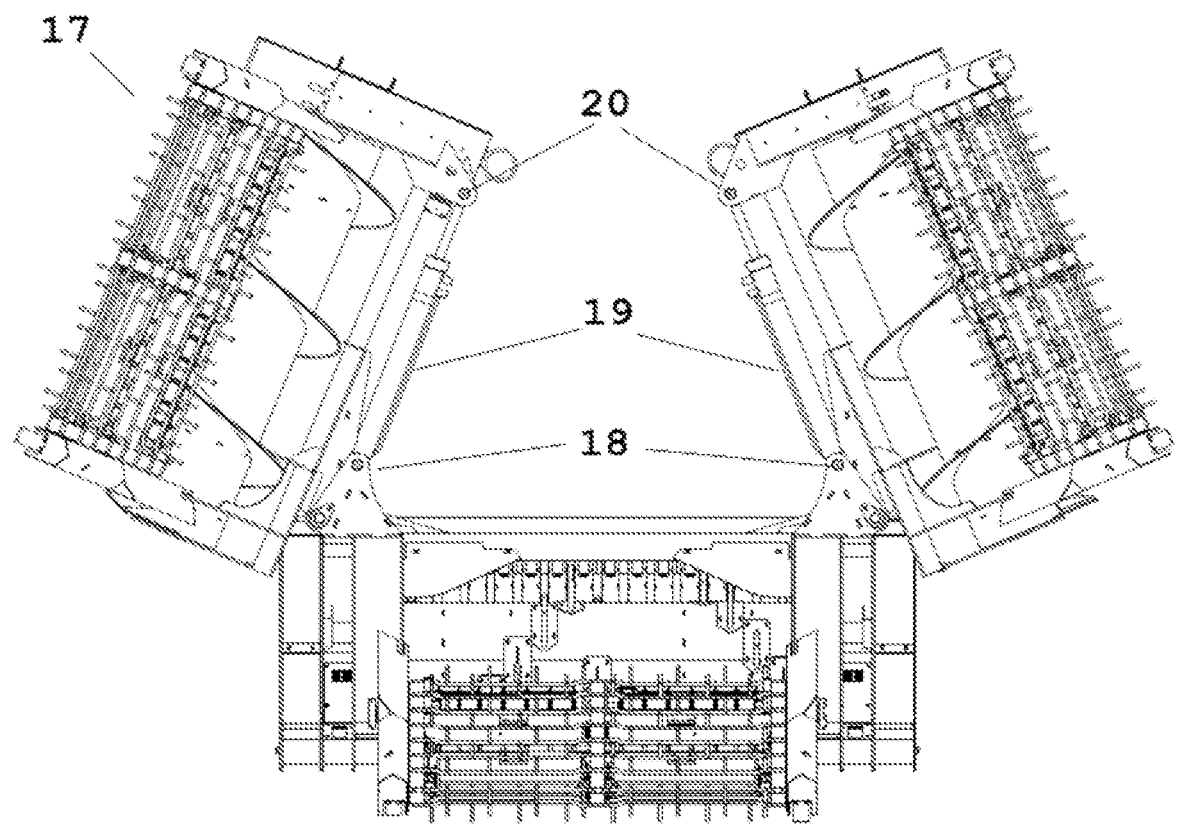
FIG. 10 shows a front view of the collecting device in a displacement or transport position.

As shown in FIGS. 7 to 10, the collecting device (17) is further defined by segmented structures, having a collecting device (17) including an internal segment and two external segments having an internal section and an external section; the internal segment hinged to the two external segments at central hinging points (18), where second set of hydraulic cylinders (19) are hinged at one end, and which shafts are hinged to the external edges (20) of the external sections of the external segments of said collecting device, at an opposite end.

The invention claimed is:

1. A constructive arrangement applied to a grain harvesting machine comprising:
   (a) a bucket defined by a cubic structure, with a base closure, a top closure a front closure, a rear closure and two side closures;
   (b) a discharge mouth mounted onto one of the side closures;
   (c) a first set of hydraulic cylinders having a first stage and a second stage;
   (d) an articulation mechanism, arranged in parallel to the front closure and to the rear closure, having a triangular structure, comprising:
      a first bar and a second bar hinged and articulated to each other, and arranged in parallel to the base closure and to the side closure bearing the discharge mouth;
      a first segmented bar and a second segmented bar hinged and articulated to each other, and arranged in parallel to the base closure and to the side closure bearing the discharge mouth; and joined to the first bar and the second bar in an articulated manner;
   wherein, the first and second bars and the first and second segmented bars are articulated in response to the actuation of the first stage of the first set of hydraulic cylinders, which articulates the side closure bearing the discharge mouth, and
   wherein further providing locks applied to the second segmented bars, and locks applied to the front closure and rear closure, maintaining the relative position of the first and second segmented bars, and preventing the articulation of the side closure bearing the discharge mouth, so that, when the second stage of the first set of hydraulic cylinders is activated, an articulation of the bucket occurs.

2. The constructive arrangement applied to a grain harvesting machine according to claim 1, further comprising a collecting device, the collecting device comprising:
   an internal segment and two external segments, the internal segment hinged to the two external segments at articulated hinging points, each of the external segments having an internal section and an external section;
   a second set of hydraulic cylinders hinged at one end to the articulated hinging points and hinged at an opposite end to external edges located at the external sections of the two external segments.

* * * * *